United States Patent [19]

Mizukami

[11] Patent Number: 5,868,022

[45] Date of Patent: Feb. 9, 1999

[54] METHOD FOR PRODUCING A DIAPHRAGM SPRING

[75] Inventor: Hiroshi Mizukami, Neyagawa, Japan

[73] Assignee: Exedy Corporation, Neyagawa, Japan

[21] Appl. No.: 20,416

[22] Filed: Feb. 9, 1998

[30] Foreign Application Priority Data

Feb. 13, 1997 [JP] Japan ................................... 9-029256

[51] Int. Cl.⁶ ...................................................... F16F 1/00
[52] U.S. Cl. ........................................................... 72/53
[58] Field of Search .................................. 72/53; 29/557

[56] References Cited

U.S. PATENT DOCUMENTS

| | | | |
|---|---|---|---|
| Re. 26,714 | 11/1969 | Komarnitsky | 29/557 |
| 1,947,927 | 2/1934 | Vorwerk | 29/557 |
| 4,135,283 | 1/1979 | Kohlhage | 72/53 |
| 4,337,632 | 7/1982 | Lienert | 72/53 |
| 4,492,102 | 1/1985 | Lienert | 72/53 |

*Primary Examiner*—David Jones
*Attorney, Agent, or Firm*—Shinjyu An Intellectual Property Firm

[57] ABSTRACT

The invention relates to a method for producing a diaphragm spring where only specific portions of the diaphragm spring are subjected to a shot-peening process. The shot-peening step is performed only to one side of an outer circumferential portion and an inner circumferential portion of the elastic portion (5a) of the diaphragm spring (5).

1 Claim, 4 Drawing Sheets

# METHOD FOR PRODUCING A DIAPHRAGM SPRING

BACKGROUND OF THE INVENTION

A. Field of the Invention

The present invention relates to a method for producing a diaphragm spring, particularly to a method for providing residual stress to a diaphragm spring for a clutch cover assembly by treating the diaphragm spring to a shot-peening process.

B. Description of the Related Art

A diaphragm spring is a disk like member used in a clutch cover assembly. The diaphragm spring typically includes an annular elastic portion and a plurality of lever portions extending radially inwardly from the annular elastic portion. One side of an outer circumferential portion of the diaphragm spring usually engages and is supported by a clutch cover, and the other side of the diaphragm spring typically engages and biases a pressure plate into engagement with a clutch disk. A releasing mechanism having a bearing typically contacts the radially inward ends of the plurality of levers portions. When such a diaphragm spring is made, a shot-peening is performed to the one-side of a diaphragm spring where a tensile stress is caused to improve its fatigue strength. In the shot-peening process, small metal balls having a particle size of from 0.5 to 1.5 mm are shot at the speed of from 50 to 80 m/second against the surface of a diaphragm spring. The surface layer of the diaphragm spring undergoes a small amount of plastic deformation as a result of the shot-peening process.

When such a shot-peening is performed, the surface layer of the diaphragm spring is microscopically extended by numerous shots. However, the surface layer can not extend because it is restricted from the inside layer. Therefore, a large amount of residual stress is imposed on the surface layer, and the residual stress improves the fatigue strength, resulting in the strength of 100 kgf/mm2.

The conventional shot-peening process is performed to only the surface of a diaphragm spring where a tensile stress is typically the greatest. Therefore, deformation such as warpage can occur at the lever portions.

SUMMARY OF THE INVENTION

An object of the present invention is to prevent a warp at a lever portion of a diaphragm spring when a shot-peening is performed.

In accordance with one aspect of the present invention, there is a method for producing a diaphragm spring which includes preparing a diaphragm spring such that the diaphragm spring has an annular elastic portion and a plurality of lever portions extending radially inward from the elastic portion. Only a single side of outer and inner circumferential portions of the elastic portion of the diaphragm spring are subjected to a shot-peening process such that an annular portion of the elastic portion between the outer and inner circumferential portions of the elastic portion remains untreated.

A residual stress is provided on the outer circumferential portion where a large tensile stress is caused, and to the inner circumferential portion which otherwise often experiences problems with durability. Therefore, with the above invention, problems relating to stress during operation is minimized. On the other hand, to both the middle portion in a radial direction of the elastic portion and the lever portion, a shot-peening is not performed. As the result, these portions are unlikely to undergo plastic deformation (permanent deformation).

DETAILED DESCRIPTION OF THE PREFERRED EMBODIMENT

Figure 1:
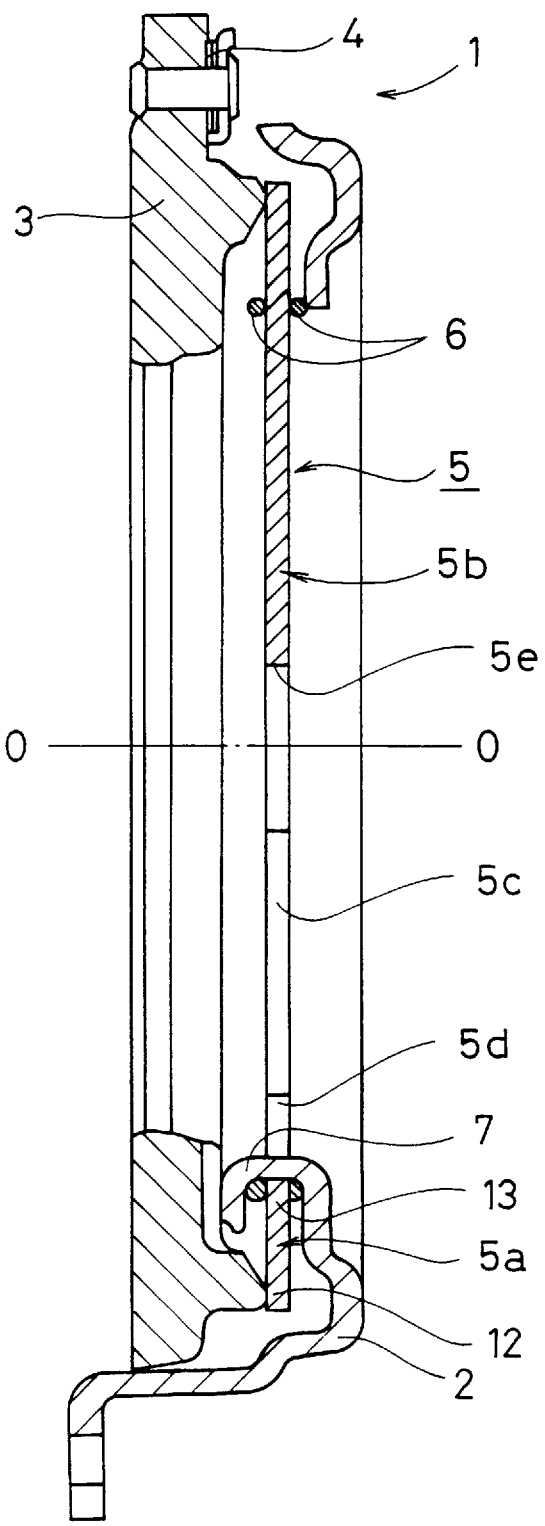
FIG. 1 is a side cross section view of a clutch cover assembly using a diaphragm spring in accordance with an embodiment of the present invention.

A clutch cover assembly 1 shown in FIG. 1 includes a clutch cover 2 of which the outer circumferential portion is fixed to a flywheel (not shown), a pressure plate 3 which is positioned on an inner circumferential side of the clutch cover 2, a strap plate 4 which connects the pressure plate 3 to the clutch cover 2, a diaphragm spring 5, and two wire rings 6 which are supported by a tab 7 bent from the inner circumferential side of the clutch cover 2 and which in turn support the diaphragm spring 5.

Figure 2:
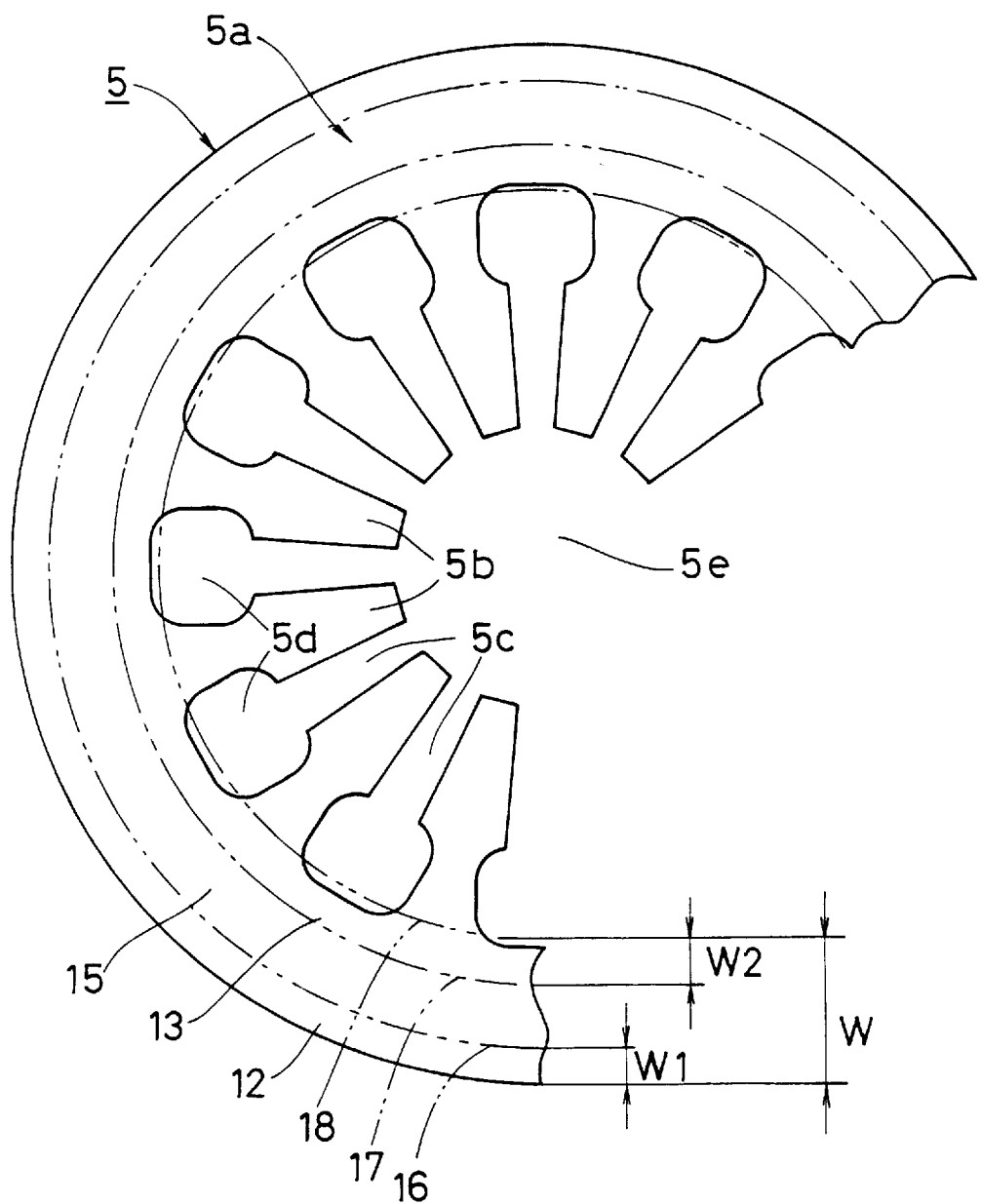
FIG. 2 is a fragmentary end view of a diaphragm spring shown removed from the clutch cover assembly depicted in FIG. 1.

The diaphragm spring 5, as shown in FIG. 2, includes an annular elastic portion 5a and a plurality of levers 5b extending radially inwardly from the annular elastic portion 5a. A slit 5c is defined between each pair of adjacent lever portions 5b, and an oval hole 5d is defined at the base of the slits 5c. The tabs 7 formed on the clutch cover 2, as shown in FIG. 1, each extend through a corresponding one of oval holes 5d, and is bent radially outward to encompass portions of the two wire rings 6. It should be understood that there may be more oval holes 5d in number than tabs 7. For instance, there may be only half as many tabs 7 as there are oval holes 5d, in which case the tabs 7 are disposed in every other oval hole 5d. Two wire rings 6 engage and retain the inner circumferential portion 13 of the annular elastic portion 5a in an axial direction. The outer circumferential portion 12 of the annular elastic portion 5a abuts on the pressure plate 3. A releasing mechanism (not shown) is engagable with the portions of the lever portions 5b around the center hole 5e for engaging and disengaging a clutch disk (not shown) associated with the clutch cover assembly.

A method for producing the diaphragm spring 5 in accordance with the present invention is as follows.

First, an annular shaped plate is formed by punching concentric holes in a flat plate material to define the inner and outer diameters in the annular shaped plate. Next, slits 5c and oval holes 5d are punched out. Thereafter, the annular shaped plate is worked to return the annular shaped plate to a planar condition and edges are subjected to a grinding process to, for instance, remove any burrs. Next, a coining operation is performed, and a finishing punching process is conducted to form the inner diameter of the hole 5e. Finally, the shape of a diaphragm spring (the annular plate member) is further worked by pressing to provide the diaphragm spring with a conical shape. In other words, the flat annular plate member is deformed by pressing to give the annular plate member a conical shape, as shown in a side cross-sectional view in FIG. 3.

The cone-shape diaphragm spring is then subjected, in order to the following processes: hardening, tempering, jig-tempering, high frequency hardening (the inner circumferential portion of the lever portions), and finally low temperature tempering. After these treatments, a shot-peening process is carried out.

Figure 3:
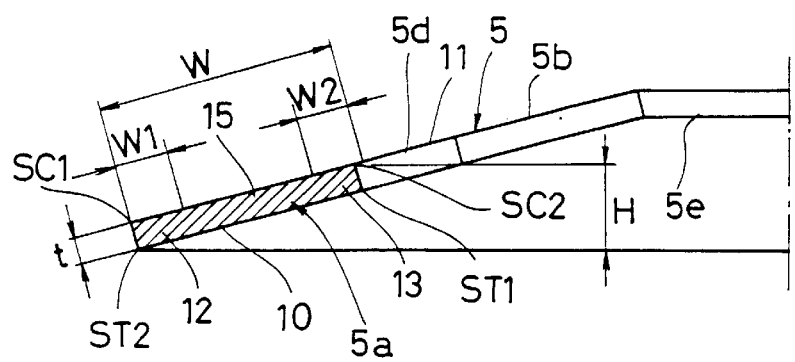
FIG. 3 is a fragmentary side cross section view of the diaphragm spring depicted in FIG. 2.

The shot-peening is performed to the face 10 of the diaphragm spring 5, shown in FIG. 3, where tensile stress is experienced during flexing of the diaphragm spring 5 in the clutch cover 1. In other words, the concave face 10 of the diaphragm spring 5 maintains a flat cone shape when not undergoing elastic deformation.

The shot-peening is not performed to the entire surface or face 10 of the diaphragm spring 5. Rather, only predetermined portions of the diaphragm spring 5 are subjected to shot-peening. Specifically, only the portion 12 of the diaphragm spring 5 confined between the radial outer edge of the diaphragm spring 5 and the dashed line 16, and the inner circumferential portion 13 confined between the dashed lines 17 and 18 (FIG. 2) are subjected to the shot-peening process. The lever portion 5b and an annular central portion 15 of the annular elastic portion 5a are not subjected to the shot-peening process.

The portions 12 and 13 described above are defined with radial widths W1 and W2, respectively, as shown in FIG. 2. The width W1 of the outer circumferential portion 12 and the width W2 of the inner circumferential portion 13 are subjected to the shot-peening process. The combination of the widths W1 and W2 is preferably greater than 10%, preferably about 20% of the width W in a radial direction of the annular elastic portion 5a. When a shot-peening is performed as described above, the specific effects on the present invention, as described below, can be realized.

Thus, as described below, since a shot-peening is performed only to the portions of the diaphragm spring where high concentrations of stress occur during operations of the clutch mechanism using the diaphragm spring of the present invention, the desired effects by the imposition of residual stress can be obtained. Since the shot-peening does not cause any deformation on the lever portion 5b and the middle portion 15 in a radial direction of the annular elastic portion 5a, warpage in these portions can be prevented. Therefore, the accuracy in the size and shape of the whole diaphragm spring 5 can be increased.

With reference to FIG. 3, on a convex face 11 of the outer radial edge of the diaphragm spring 5 there is stress SC1 during elastic deformation of the diaphragm spring 5. An inner radial edge of the middle portion 15 at the face 11 undergoes a stress SC2 during elastic deformation of the diaphragm spring 5. On a concave face 10 of the diaphragm spring 5 there are similar corresponding stresses ST1 and ST2 defined at inner and outer radial edges of the middle portion 15 of the diaphragm spring 5. Relationships between the stresses ST1, ST2, SC1 and SC2 are plotted in FIG. 4. The abbreviations represent the following:

ST1=Tensile stress at point 1

ST2=Tensile stress at point 2

SC1=Compressive stress at point 1

SC2=Compressive stress at point 2

Figure 4:
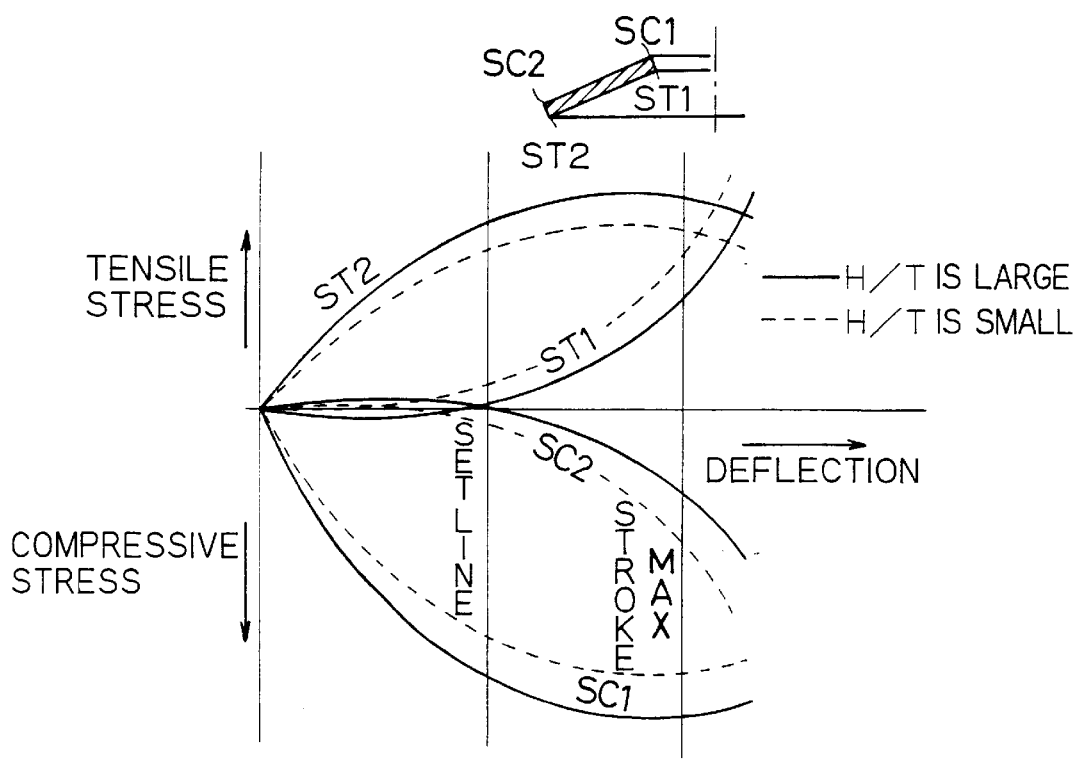
FIG. 4 is a graph showing changes in the amount of stress of a diaphragm spring.

FIG. 4 is a graph which shows relations between stress and bending (elastic deformation) amounts at the inner outer circumferential edges the convex face 11 and the concave face 10 and further includes a ratio (H/t). A height H is measured in FIG. 3 and corresponds to the depth of the conical outer portion of the diaphragm spring. A thickness t corresponds to the thickness of the diaphragm spring, also shown in FIG. 3. The ratio (H/t) is the ratio between the height H and the thickness t of the annular elastic portion 5a.

Figure 5:
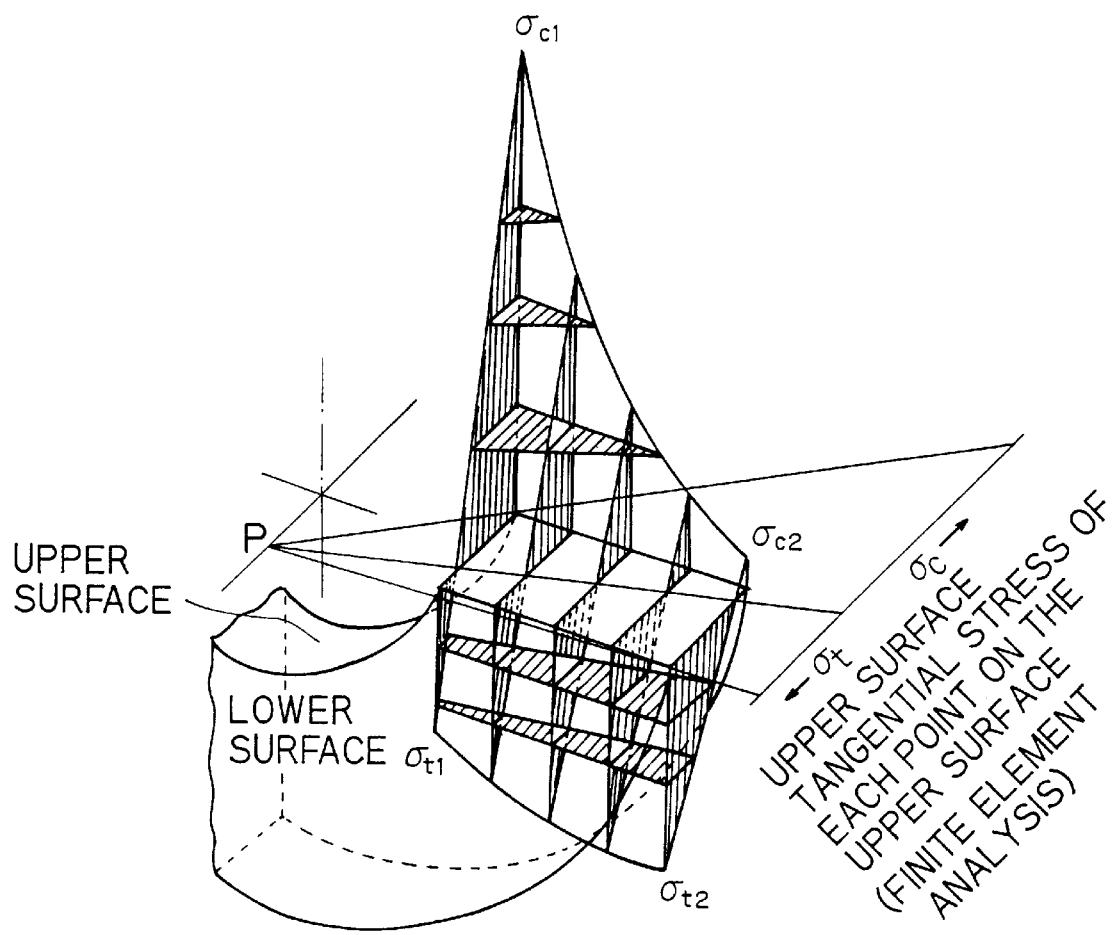
FIG. 5 shows a three dimensional rendering of the stress distribution of a diaphragm spring in accordance with the present invention.

In the graph depicted in FIG. 4, the solid lines represent the stresses SC1, SC2, ST1 and ST2 in the case where the ratio (H/t) is relatively large and the dashed lines correspond to the stresses SC1, SC2, ST1 and ST2 in the case where the ratio (H/t) during non-operation is relatively small. FIG. 5 shows stress distribution during operation (elastic deformation) of the diaphragm spring 5.

As shown in FIG. 5, the absolute value of a tensile stress of the outer circumferential side at the lower face is higher than that of the inner circumferential side. However, as shown in FIG. 4, there is a large difference between the tensile stress (ST1) of the inner circumferential side and the stress value at the set line (at the initial assembling condition) and the stress value at the maximum (MAX) stroke during the clutch operation. Therefore, the stress amplitude of the inner circumferential side is large during the repeated operation after the diaphragm spring 5 is used for clutch operation. As the result, from the point of view of durability, the inner circumferential side is more likely to fail than the outer circumferential side, when considering concentrated stress on the edge portion of the oval hole 5d.

Consequently, when the residual stress is given by a shot-peening to the outer circumferential portion 12 where a large tensile stress is caused and to the inner circumferential portion which tends to have a problem with durability, problems such as a deformation or damage because of a stress during operation and an abnormal abrasion because of the deformation can be prevented reliably.

Considering that failure may occur at an end portions, damage can be prevented effectively by giving a residual stress to both the inner and outer circumferential edge portions.

As is generally known, a shot peening has not only the effect to cause a residual stress, but also the effect to increase the surface hardness by a heat treatment or temper effect. Therefore, when a shot-peening is performed to the inner circumferential portion 13 of the annular elastic portion 5a abutting on the wire ring 6 (FIG. 1) and the outer circumferential portion 12 of the annular elastic portion 5a abutting on the pressure plate 3, the hardness of these abutting portions increases and the abrasion of these abutting portions is minimized.

The abrasion by the pressure plate 3 or the wire ring 6 tends to be caused especially at the lower face (the concave face 10) side. Therefore, such abrasion can be prevented effectively by performing a shot-peening on the lower face 10 of the annular elastic portion 5a.

Thus, in the present invention, the durability of a clutch can be increased, since the damage, deformation and abrasion of the diaphragm spring 5 can be minimized effectively by a shot-peening. In addition, since the abrasion and deformation can be controlled, the operation characteristics of the diaphragm spring can be maintained so as to minimize possible changes over a lapse of time of its usage.

In the method to produce a diaphragm spring relating to the present invention, at a shot-peening step, a shot-peening is performed only to the one-sides of the outer and inner circumferential portion of an elastic portion where a tensile stress is caused. Since the residual stress is given by a shot-peening to the outer circumferential portion 12 where a large tensile stress is caused and to the inner circumferential portion which tends to have a problem about durability, problems by a stress during operation are minimized. In addition, since a shot-peening is not performed to the middle portion in a radial direction of an elastic portion and to a lever portion, these portions are less likely to undergo plastic deformation.

What is claimed is:

1. A method for producing a diaphragm spring, comprises preparing a diaphragm spring such that the diaphragm spring has an annular elastic portion and a plurality of lever portions extending radially inward from the elastic portion shot-peening only a single side of outer and inner circumferential portions of the elastic portion of the diaphragm spring such that an annular portion of the elastic portion between the outer and inner circumferential portions of the elastic portion remain untreated.

* * * * *